United States Patent
Reese et al.

(10) Patent No.: US 8,731,336 B2
(45) Date of Patent: May 20, 2014

(54) MULTI-PERPENDICULAR LINE-BASED DESKEW WITH AFFINE AND PERSPECTIVE DISTORTION CORRECTION

(75) Inventors: Jack Reese, Lindon, UT (US); Shawn Reid, Orem, UT (US)

(73) Assignee: Ancestry.com Operations Inc., Provo, UT (US)

( * ) Notice: Subject to any disclaimer, the term of this patent is extended or adjusted under 35 U.S.C. 154(b) by 210 days.

(21) Appl. No.: 13/325,396

(22) Filed: Dec. 14, 2011

(65) Prior Publication Data

US 2013/0156344 A1    Jun. 20, 2013

(51) Int. Cl.
*G06K 9/32* (2006.01)
*G06K 9/36* (2006.01)
*G06K 9/40* (2006.01)

(52) U.S. Cl.
USPC .............................. 382/296; 382/275; 382/27

(58) Field of Classification Search
USPC ......... 382/162, 192, 276, 286, 289–290, 296; 358/488, 452, 474, 537, 455
See application file for complete search history.

(56) References Cited

U.S. PATENT DOCUMENTS

| | | | | |
|---|---|---|---|---|
| 5,187,753 | A * | 2/1993 | Bloomberg et al. | 382/289 |
| 5,355,420 | A * | 10/1994 | Bloomberg et al. | 382/155 |
| 5,497,236 | A * | 3/1996 | Wolff et al. | 358/296 |
| 7,356,200 | B2 * | 4/2008 | Zuniga | 382/289 |
| 7,873,216 | B2 * | 1/2011 | Zandifar et al. | 382/177 |
| 7,903,876 | B2 * | 3/2011 | Zandifar et al. | 382/176 |
| 2004/0252911 | A1 * | 12/2004 | Zuniga | 382/290 |
| 2005/0094897 | A1 * | 5/2005 | Zuniga | 382/290 |
| 2010/0014782 | A1 * | 1/2010 | Fero et al. | 382/290 |

* cited by examiner

*Primary Examiner* — Andrae S Allison
(74) *Attorney, Agent, or Firm* — Kilpatrick Townsend & Stockton LLP (57) ABSTRACT

The present invention provides a method of correcting alignment of an image. The method includes identifying an image of a document, and detecting a plurality of lines within the image. The method also includes classifying at least a subset of the plurality of lines as either horizontal or vertical lines, and determining whether a variance exists within a subset of the plurality of lines. Furthermore, the method includes applying a corrective transformation to adjust the image, where the variance within the subset of the plurality of lines is at least partially reduced as compared to the variance prior to the application of the corrective transformation.

9 Claims, 7 Drawing Sheets

MULTI-PERPENDICULAR LINE-BASED DESKEW WITH AFFINE AND PERSPECTIVE DISTORTION CORRECTION

BACKGROUND

This invention relates generally to processing document images. More specifically the invention relates to image distortion correction in document images.

As more and more documents and images are transferred to computer-readable mediums, distortion of the original documents can occur. Be it from the method of imaging the document, or the particular device or program being used, distortion problems beyond mere rotational issues are frequent.

Many traditional and present deskewing programs are unable to correct image distortion. Despite the program being referenced for so-called "deskewing," the algorithms applied are unable to effect more than a re-alignment of the image, as opposed to an actual correction of the image itself. While rotational correction may be sufficient for some document transfers where a direct scan of the document is all that occurs, for many other imaging applications such a correction would be insufficient. For example, when a transformation is applied to a digital image, such as scaling, rotating, or scanning, perspective and projective distortions can be introduced. Current correction applications would be unable to correct any such distortion, and hence the document image can be rendered useless due to certain transfer distortions.

Additionally, many of the current programs must be applied on an individual basis to images and documents that can span hundreds, if not thousands of pages. Current programs, in addition to not correcting many distortions, create an excessively cumbersome process by which correcting documents and images occurs. Not only is the user made to determine what documents and images require correction, but the user is then required to individually process each document or image of the series in turn. Such a process can introduce unwanted time and expense that is unacceptable to many business models.

For example, if historical census documents are being transferred from the original census papers, or alternatively from an image of the original census papers such as microfiche, the documents may contain hundreds, thousands, tens of thousands or more pages to be transferred. If every image needed to be individually viewed and then a determination is performed of whether a correction is needed, the entire process could take years to finish. What is needed is an application for detecting and correcting a variety of distortions that can occur in document imaging from multiple sources. The present invention meets this and other needs.

BRIEF DESCRIPTION

In one embodiment, the present invention provides a method of correcting alignment of an image. The method includes identifying an image of a document, and detecting a plurality of lines within the image. The method also includes classifying at least a subset of the plurality of lines as either horizontal or vertical lines, and determining whether a variance exists within a subset of the plurality of lines. Furthermore, the method includes applying a corrective transformation to adjust the image, where the variance within the subset of the plurality of lines is at least partially reduced as compared to the variance prior to the application of the corrective transformation.

In another embodiment, a method of correcting skew in an image containing line-based features is described. The method includes identifying a skewed image, as well as detecting multiple lines within the image. Additionally, the method includes classifying a subset of the multiple lines as horizontal lines, vertical lines, or a combination of horizontal lines and vertical lines. The method also includes determining that at least one line is distorted in that the line deviates from the axis of symmetry of the line in at least one segment along the line. The method further includes applying a truing application to the image to adjust the distorted line or lines to be reformed along the axis of symmetry of the line to deskew the image.

In a further embodiment, the present invention describes a computer-readable medium. The computer-readable medium includes instructions for identifying an image of a document, and detecting a plurality of lines within the image. The computer-readable medium also includes instructions for classifying at least a subset of the plurality of lines as horizontal lines or vertical lines, and determining that a variance exists within the subset of the plurality of lines. Further, the computer-readable medium includes instructions for applying a corrective transformation to adjust the image, where the variance within the subset of the plurality of lines is at least partially reduced as compared to the variance prior to the application of the corrective transformation.

Additional embodiments and features are set forth in part in the ensuing detailed description and accompanying drawings, and in part will become apparent to those skilled in the art upon examination of the specification, or may be learned by the practice of the invention. The features and advantages of the invention may be realized and attained by means of the instrumentalities, combinations, and methods described in the specification.

BRIEF DESCRIPTION OF THE DRAWINGS

The present invention is described in conjunction with the appended figures.

In the appended figures, similar components and/or features may have the same numerical reference label. Further, various components of the same type may be distinguished by following the reference label by a letter that distinguishes among the similar components and/or features. If only the first numerical reference label is used in the specification, the description is applicable to any one of the similar components and/or features having the same first numerical reference label irrespective of the letter suffix.

DETAILED DESCRIPTION

In the following description, for the purposes of explanation, numerous details are set forth in order to provide an understanding of various embodiments of the present invention. It will be apparent, however, to one skilled in the art that certain embodiments can be practiced without some of these details, or with additional details.

The present invention provides methods for correcting variances and distortions in images. The methods can involve detecting lines in the image and determining if there is a variance within or between the lines. The methods can further involve applying a corrective transformation to the image to at least partially correct the detected variance.

I. DEFINITIONS

As used herein, the term "deskew" refers to any means of correcting an image skew or distortion, or any variance determined within the image. Skew can refer to slanting or an oblique direction, and can also include any deviation from straight lines or right angles.

As used herein, the term "variance" refers to any detectable difference existing between an item and a reference. The reference can be any other item to which the first item is compared, or alternatively can be the first item itself in some other form. For example, the first item can be a line detected in an imaged document, and the reference for determining variance of the line can be numerous other items, or can be the line itself in some other form. If the line is in one example determined to be a horizontal line, but when compared to the line in the original, un-imaged document is other than level horizontally, then the line of the original document is the reference by which the variance can be determined. Alternatively, a reference set of axes, additional horizontal line, additional vertical line, or any other item can be used for the determination of whether the line is horizontal and determine the existence of a variance.

As used herein, the phrase "corrective transformation" refers to any process or adjustment performed to reduce a variance in an image. The corrective transformation can include reforming individual lines, adjusting the spacing between items in the image, adjusting the entire image or a portion of the image, etc.

As used herein, the phrase "angle of deviation" refers to any angle existing that is other than a preferred angle. For example, for a determination of at least two horizontal lines or at least two vertical lines, an angle of deviation can refer to the lines being other than equidistant at all points along the lines, or that there is a detectable angle between the two lines. For a horizontal line and a vertical line, an angle of deviation can be that an angle other than ninety degrees occurs at the intersection, or projected intersection, of the two lines.

As used herein, the phrase "perspective distortion" refers to a line distortion in which the lines appear to move towards or away from each other, or appear longer or shorter due to orientation, and can include foreshortening, angling, etc. For example, a series of horizontal lines that are parallel in the original image may include a perspective distortion in the image after it has been scanned, and can appear to be of zero, one, two, or three point perspective based on the original image. The distortion may be from any source including a lens effect induced from the imaging device, the original document having a lifting from the scanning device occurring during imaging, such as at a binding source where the document cannot be maintained flush with the imaging device, or from any other source. Such a distortion can make the lines appear to be moving closer together or farther apart across the image.

As used herein, the phrase "shear distortion" refers to a line distortion in which a line or group of lines deviates from an axis of symmetry of the line or lines, or when there is a misperception of relative object distances based on the perspective of the image. For example, a line in an image may appear to shear from its axis of symmetry due to a crease in the original image as it is scanned. Thus the crease would cause a horizontal line to deviate from the horizontal at the point of the crease and continue at an angle within the image. As another example, a lens effect of the imaging device may cause a line or group of lines to appear to move from their axis of symmetry in an exponential or parabolic path, which can be indicative of a shear distortion of the line or lines.

As used herein, the phrase "optical distortion" refers to aberrations based on the rendering of straight lines as curved lines. This can lead to known lens distortions including barrel distortion, pincushion distortion, etc.

As used herein, the phrase "geometric distortion" refers to distortions occurring from the rendering of three-dimensional objects in two dimensional space. Photographs and other renderings can be affected by such distortion. This distortion can also encompass many of the distortions listed as perspective and optical distortions.

As used herein, the phrase "reference axis" refers to a line or set of lines, either real or imaginary, that are of a known angle or direction that do not deviate from that angle or direction and can be used to coordinate the location of one or more points in a plane or space.

As used herein, the phrase "axis of symmetry" refers to any real or constructed line through an object or line such that the portion of the image or line on either side of the axis is identical.

II. METHOD OF CORRECTING AN IMAGE

In some embodiments, the invention provides a method of correcting the alignment of an image. The method includes identifying an image of a document, and detecting a plurality of lines within the image. The method also includes classifying at least a subset of the plurality of lines as either horizontal or vertical lines, and determining whether a variance exists within a subset of the plurality of lines. Furthermore, the method includes applying a corrective transformation to adjust the image, where the variance within the subset of the plurality of lines is at least partially reduced as compared to the variance prior to the application of the corrective transformation.

In some embodiments, the identification is performed when a user loads an image of a document. The image can be loaded from a computer-readable medium, and can be loaded into an application, such as a genealogical application for directing documents and producing files that may contain the image. In other embodiments, the identification can be performed in conjunction with an image scanning device, and can be performed automatically on the scanning of an image. For example, some scanning devices include the capability to turn pages, and thus require little if any human interaction to scan entire record books. The program receiving the scanned images can include an exemplary method of correcting alignment of the images as explained herein, and can perform an alignment directly upon receiving the image. Advantageously, this can reduce the amount of time and human capital needed to acquire useable versions of important documents and images.

The plurality of lines can be determined based on any line-based feature of the image. The image can be of a document that contains text, or can be of a picture, such as a photograph. In some embodiments, the document can be a photograph, or a combination of text and picture. The document can include features with distinct lines, such as a table or grid, or can include text that is set in a horizontal or vertical fashion, and can be distinguished based on the existence or absence of characters. For example, most romance languages, as well as many other languages, are written horizontally, and include lines of space above and/or below each line of text. The lines in between lines of text, as well as the lines of text themselves, can be the line-based features detected as the plurality of lines. As another example, many Asian languages such as Mandarin are written vertically and include spaces on the sides of each line of text. Thus, in some embodiments, the vertical lines of text, or the vertical lines of spacing between these lines of text can be the line-based features detected as the plurality of lines.

Line-based features of an image that includes a photograph can also be used to detect the plurality of lines. For example, streets, fences, trees, etc. can be used as horizontal and vertical line-based features detected as the plurality of lines. Alternatively, the image may be a scan of an image of a document, such as a microfiche image of a census document, and thus the image itself may include tables or grids that can be detected as the plurality of lines. Similarly, a line can be detected despite that it does not span the entire document. For example, a table located in the image may only span a portion of the page, and thus the lines of the table that can be the subset of detected lines of the image may not span the length or width of the document. However, based on the length of the line, or a portion of that length, the line can be detected as a line of the image.

The method further includes classifying at least a subset of the plurality of lines as horizontal lines and/or vertical lines. The subset of lines can be a single line, or more preferably can be about two or more lines, and can be as high as about tens of lines or more depending on the image. Performing the classification can include a determination based on at least a portion of the line or lines, or on the entire line as it relates to the image. In one embodiment, a portion of the line is used for the classification due to skewing of the image. For example, a skewed image of a grid may only have skewing in one section of the grid, such as at an edge. This edge that is skewed can be difficult to classify as horizontal or vertical depending on the extent of skewing, despite that the lines can still be detected as lines. Another portion of the grid may include no skewing at all, and thus that portion can be used to classify the lines as horizontal or vertical.

Determining that a variance exists within the subset of the plurality of lines can be based on one or more lines in the image. The variance can exist between two horizontal lines or two vertical lines that are other than parallel with each other. Alternatively, the variance can exist between one horizontal line and one vertical line that are determined to be other than perpendicular to each other. The variance can include an angle of deviation from parallel or perpendicular depending on the lines used to determine variance.

In some embodiments the variance can be many degrees from a preferred instance, and in other embodiments the variance can be as slight as about one degree of difference from what would be preferred. In any embodiment, any range of acceptable angles or degrees can be used. By way of example, the angles of at least one classified horizontal and at least one classified vertical line may be compared and determined to be at an angle of about eighty-nine degrees, as opposed to ninety degrees, which would otherwise indicate that the lines are perpendicular. In some embodiments, the angle may be consistent along the lines, or alternatively, may increase or decrease along the length of the line or lines to be an angle many degrees different than perpendicular.

The variance determined can be indicative of any known distortion. In some embodiments, within-group and between-group variance can be used to identify variance types, or alternatively models mapped to certain lines can be used. In some embodiments the determined variance is indicative of perspective foreshortening, skew distortion, shear distortion, barrel distortion, pincushion distortion, or any other type of optical, perspective, or geometric distortion known to one of skill in the art. In detecting the variance any number of methods can be used based on the vertical and horizontal lines of the image. In some embodiments a statistical distribution is performed on horizontal and vertical line orientations to calculate the variance and/or standard deviation of horizontal and vertical lines sets. In other embodiments a standard deviation is calculated for individual lines, or line sets. Any other known mathematical algorithm or computer-calculated method can be used to determine the variance of lines associated in the image, such as least squares fitting, for example. In some embodiments, the algorithm can compute and return comprehensive line-based information to facilitate, for example, proper deskew, affine distortion correction, perspective distortion correction, etc. In some embodiments, this process can be performed automatically.

When a variance is determined to exist, a corrective transformation can be applied to the image in order to reduce or remove the variance. The corrective transformation can be applied in some applications and not others based on the degree of variance that is determined by the method. For instance, in some embodiments, the corrective transformation may not be applied unless the variance is calculated to be greater than about five percent from the original document. In other embodiments the calculation can have a variance tolerance higher or lower than about five percent that can be any percentage different up to any reasonable range, and in still other embodiments that calculation of variance can be based on a number of degrees, or an extent of a curve, among other possible bases for determining a degree of variance. The determination can be based on the types of images being identified, and for example, more complex images with more and closer lines may have a lower tolerance for variance, and more simple images with less lines or features may have a higher tolerance for variance. Alternatively, the opposite of the above example may be true in other examples depending on the specific requirements of an application.

For a number of degrees, for example, when a line classified as being vertical is determined to deviate from a vertical axis of symmetry or reference axis, this can trigger the application of the corrective transformation. Only by way of example, in some embodiments if the line deviates from the axis of symmetry or other reference axis by about one degree or more, about five degrees or more, or about ten degrees or more, the corrective transformation can be applied. Other examples may allow a higher degree of variance, and still other examples may allow a lower degree of variance depending on the specific application.

The corrective transformation can remove the variance from the original document completely, and in other embodiments may only reduce the variance partially as compared to the variance prior to the application of the corrective transformation. Based on the lines of the image and the variance determined, a model of the document can be created that can be used to determine the proper transformation for correcting the variance. The model can facilitate determining the type of distortion in the image, which in turn can establish the needed transformation.

Once the transformation has been performed, in some embodiments a further correction of the document can occur. The subsequent correction can involve a similar or different type of corrective transformation, or in other embodiments may require only a re-orientation of the image. In still other embodiments, a corrective transformation can be determined to be unnecessary for several reasons, including that the variance is not within the specified tolerance for applying a corrective transformation. However, the classified lines may indicate that a re-orientation is necessary, with or without a corrective transformation.

In some embodiments, a more optimal rotation angle can be provided than an XY axis alignment allowing for better deskewing or distortion correction. For example, the image can be deskewed to optimize horizontal orientation along the X axis, or vertical orientation along the Y axis. Many other traditional or specifically formed axes can be used depending on various perspectives depending on the application. As another example, the transformation can be applied in order to square-up, or true-up the image along both XY axes prior to de-rotation. Advantageously, this can yield a better result than can a single-angle deskew in some embodiments.

The re-orientation that can occur with a corrective transformation, or separately from a corrective transformation, and can be determined based on lines of the image being at an angle other than the orientation of a reference axis. For example, each of the vertical lines, or horizontal lines, or both may be at a similar angle of deviation from a reference axis, or set of axes, such that a re-orientation of the image would correct the deviation. Hence, in some embodiments, rotating the adjusted image can equalize the orientation of the lines in the image with the reference axis or set of axes.

Identifying an image can occur at an imaging device, such as a computer imaging device. The imaging device can be operable to process the image identified, store the image, and retrieve the image prior to detecting the plurality of lines within the image. The image can be stored on any suitable computer-readable medium, and can be retrieved either separately from or in conjunction with another program.

The image that can be obtained and identified by an imaging device can be a computer-readable image in some embodiments. The computer-readable image can be generated with a document imaging system that captures the image of a document. Any known document imaging system can be used to generate the computer-readable image, and can include, for example, microfilm, microfiche, an on-demand printer, a facsimile machine, a copier, a document scanner, a multifunction printer, etc.

Any combination of document imaging systems can also be used in some embodiments to generate the computer-readable image. In some embodiments one document imaging system is used to capture the image of the document. In yet other embodiments, two, three, or more document imaging systems are used to generate the computer-readable image. For example, many historical documents, such as newspapers, or census documents are preserved on microfiche that is then scanned by a scanning device onto a computer. These multiple levels of transfer can be the source of many of the distortions seen in images of historical documents.

In another embodiment of the invention, a method of correcting skew in an image containing line-based features is described. The method includes identifying a skewed image, as well as detecting multiple lines within the image. Additionally, the method includes classifying a subset of the multiple lines as horizontal lines, vertical lines, or a combination of horizontal lines and vertical lines. The method also includes determining that at least one line is distorted in that the line deviates from the axis of symmetry of the line in at least one segment along the line. The method further includes applying a truing application to the image to adjust the distorted line or lines to be reformed along the axis of symmetry of the line to deskew the image.

Identifying a skewed image can occur by various means. In one embodiment, the image is identified as skewed by a user, and then an application can be performed on the skewed image. In other embodiments, an image is identified as skewed automatically based on features of the image indicating skew or other distortions. Such features can include slanting or obliqueness of lines, shapes, or other items in the image.

An image identified as skewed can be analyzed to detect multiple lines within the image. The multiple lines can be detected, in some embodiments as noted previously, from tables, grids, or other line-based features of a document or image.

Once lines within the image have been detected, a subset of the lines can be classified as horizontal lines, vertical lines, or some combination of horizontal and vertical lines. The subset can be one, two, or more lines up to and including dozens of lines or more within an individual image, and the classification can be a determination of whether a line or lines are horizontal or vertical. The classification can be performed as an individual line analysis, or by analyzing some or all of the lines of the document together. In other embodiments, the classifying is at least in part based on a comparative orientation of at least two lines, including whether the at least two lines are parallel or perpendicular to each other.

Such a comparative orientation can be performed, in some embodiments, within a range such that two lines or a set of lines can be determined to be parallel or perpendicular despite a deviation from a true parallel or perpendicular. For example, the orientation of two horizontal lines with skew may not be parallel in that the lines are not equidistant at all points. However, the comparative orientation between these lines or between these lines and other lines, can allow a determination of parallelism because the lines fall within a certain range of acceptable angles deviating from perfectly parallel. Similarly, a horizontal line and a vertical line, or sets of horizontal lines and sets of vertical lines, can be determined to be vertical despite that the lines are not at right or ninety degree angles from each other. Thus by allowing a range of angles and deviations to be acceptable, more accurate transformations can be performed based on the level of skewing or distortion that occurs in a document.

In some embodiments, the analysis can be based on a portion of the lines, or alternatively can be based on the entirety of each line to which a classification is being performed. For example, in an image in which a large amount of skew has occurred, an edge or other portion of the document may include lines that have been slanted to various angles. These angles may make difficult a determination of whether a line or set of lines are either horizontal or vertical. In certain of these instances, a separate portion of the line or lines may not include the same amount of skewing or distortion. In these cases, the portion of the line with less skew can be used to determine whether the line is horizontal or vertical. In still another embodiment, some lines may have a large amount of skew, but not others. In these embodiments, the lines with less skew can be used to determine if the set of lines is horizontal or vertical.

When the lines have been classified, the method includes determining that at least one line is distorted. This distortion may be based on the line deviating from the axis of symmetry of the line in at least one segment along the line. The axis of symmetry of a line or set of lines can be based on the projected axis of a distorted line, or on any other reference axis within the image or directed to the image. Depending on the type and amount of skew of a line or set of lines, the axis can be projected based on unskewed portions of the line, or on other lines that do not have the same amount of skew. In some embodiments, the determination can be based on comparing at least one line to at least one other line or lines in the image to determine the type and extent of skewing.

For example, a grid can be located in the image, and some lines in one section of the image do not appear to have skew or have minimal skewing, but lines at the outside of the document can have skew distortions with lines slanting in a particular direction such that angles greater than ninety degrees perpendicular are detected between groups. In such a situation, the line portions that are not skewed can be used to project the axis of symmetry for the lines. Alternatively, if only the horizontal lines are skewed in one embodiment, and the vertical lines are equivalent to their axis of symmetry, then a horizontal axis of symmetry can be projected at a ninety degree angle from the vertical axis of symmetry. From this axis of symmetry, the amount of distortion of the lines from the horizontal axis of symmetry can be quantified.

After at least one line has been determined to be distorted, a truing application can be applied to the distorted lines, or to the image as a whole. As described previously, in some embodiments, a determination of whether to apply the truing application can be based on a specified deviation range of the lines determined to have distortion. The truing application can be capable of adjusting the lines determined to be distorted or the image entirely to be reformed along the projected or a corrected axis of symmetry of the lines to deskew the image. In some embodiments the truing can include affine transformations, or any type of translation in which collinearity is preserved or created, or in which finite lines or points are mapped to other finite lines or points.

In some embodiments, the truing application can be configured to model the image to determine how the image can be best adjusted. By first modeling lines within the image or the entire image, an algorithm can perform a series of calculations to determine the proper amount of truing to best correct the image. The modeling can include a model set of axes that accounts for deviations that occur within the image, or in other embodiments the modeling can include modeling of each line detected within the document so that more fine-tune and narrow truing can be performed.

In a further embodiment, the present invention describes a compter-readable medium. The computer-readable medium includes instructions for identifying an image of a document, and detecting a plurality of lines within the image. The computer-readable medium also includes instructions for classifying at least a subset of the plurality of lines as horizontal lines or vertical lines, and determining that a variance exists within the subset of the plurality of lines. Further, the computer-readable medium includes instructions for applying a corrective transformation to adjust the image, where the variance within the subset of the plurality of lines is at least partially reduced as compared to the variance prior to the application of the corrective transformation.

Figure 1:
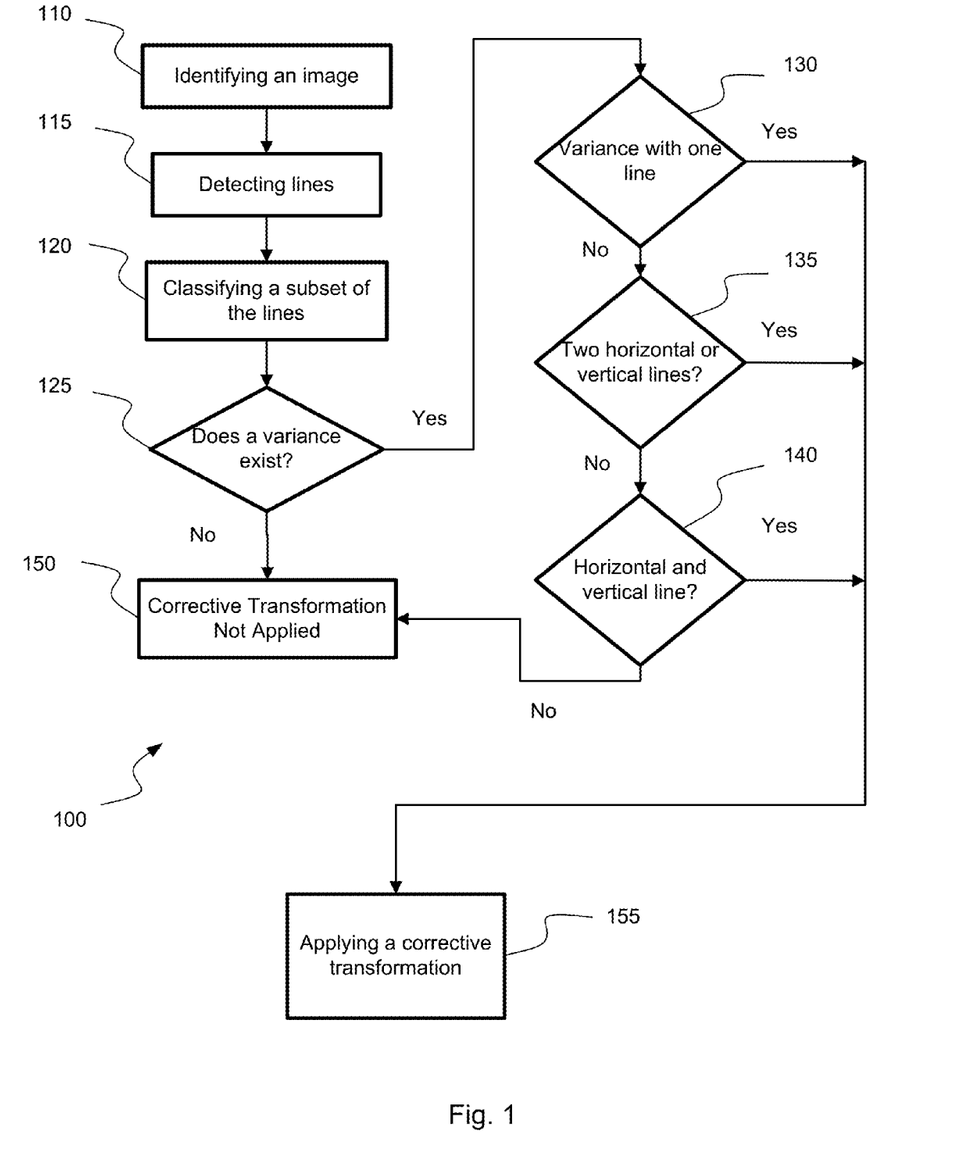
FIG. 1 shows a flow diagram of a process for detecting an image with a variance and applying a corrective transformation.

Turning now to the figures, FIG. 1 shows a flow diagram of a process 100 for detecting an image with a variance and applying a corrective transformation. In one embodiment, process 100 can be carried out by identifying an image 110. The image may be of a document or of a picture that can be used in a variety of applications including genealogy applications. The identified image can be analyzed to detect 115 multiple lines within the image. The lines can be based on features of the image, such as line-based features of images or text, or alternatively based on lines within the image such as tables or grids.

The multiple lines that are detected can be classified 120. In some embodiments, all of the detected lines are classified, and in other embodiments a subset of the lines are classified. The classifying can include a determination of whether the lines are horizontal or vertical, or in some combination of horizontal and vertical.

After the lines or a subset of the lines are classified, the image is analyzed to determine 125 if a variance exists. The determination of a variance can in some embodiments be based on a single line, or on multiple lines that have been classified. In other embodiments, the determination of variance can be based on a range or a tolerance for an acceptable level of deviation, such that a variance can exist, but not be over the specified tolerance such that a transformation is not applied.

If a variance does not exist, a corrective transformation may not be applied 150. If a variance does exist, the type of variance can be determined. The variance may not occur with at least two lines, and in some embodiments, can occur with only one line in the image 130. This can be the result, for example, of a minor amount of distortion that affects a single classified line in the document. The variance may occur between two horizontal or two vertical lines 135. Such a variance can be indicative of foreshortening or other geometric distortion. Alternatively, the variance can be between a horizontal and a vertical line 140, or sets of horizontal and vertical lines, and can be indicative of skewed or shear images.

Once a variance has been identified and/or classified, a corrective transformation can be applied 155. The corrective transformation can include modeling, and can include specific transformations depending on the types of variance detected. The modeling can enable more rapid calculation of the transformations that can be applied, and their effects, and can thus save time. The corrective transformation can be applied in the same fashion each time based on a list of possible transformations available, or can be tailored based on the modeling or identification of the types of variance that exists.

For example, if there is high between-group-variance for the horizontal and vertical lines, which can be indicative of skew or shear, an affine transformation can be applied in some embodiments as the corrective transformation. Alternatively, if there is high within-group-variance in a set of horizontal or vertical lines, which can be indicative of foreshortening, a corrective transformation can be applied to remove angling, correct line lengths for perspective, and so forth. The corrective transformation can completely remove the variance in some embodiments, or alternatively can partially reduce the variance as compared to the variance prior to the application of the corrective transformation.

Figure 2:
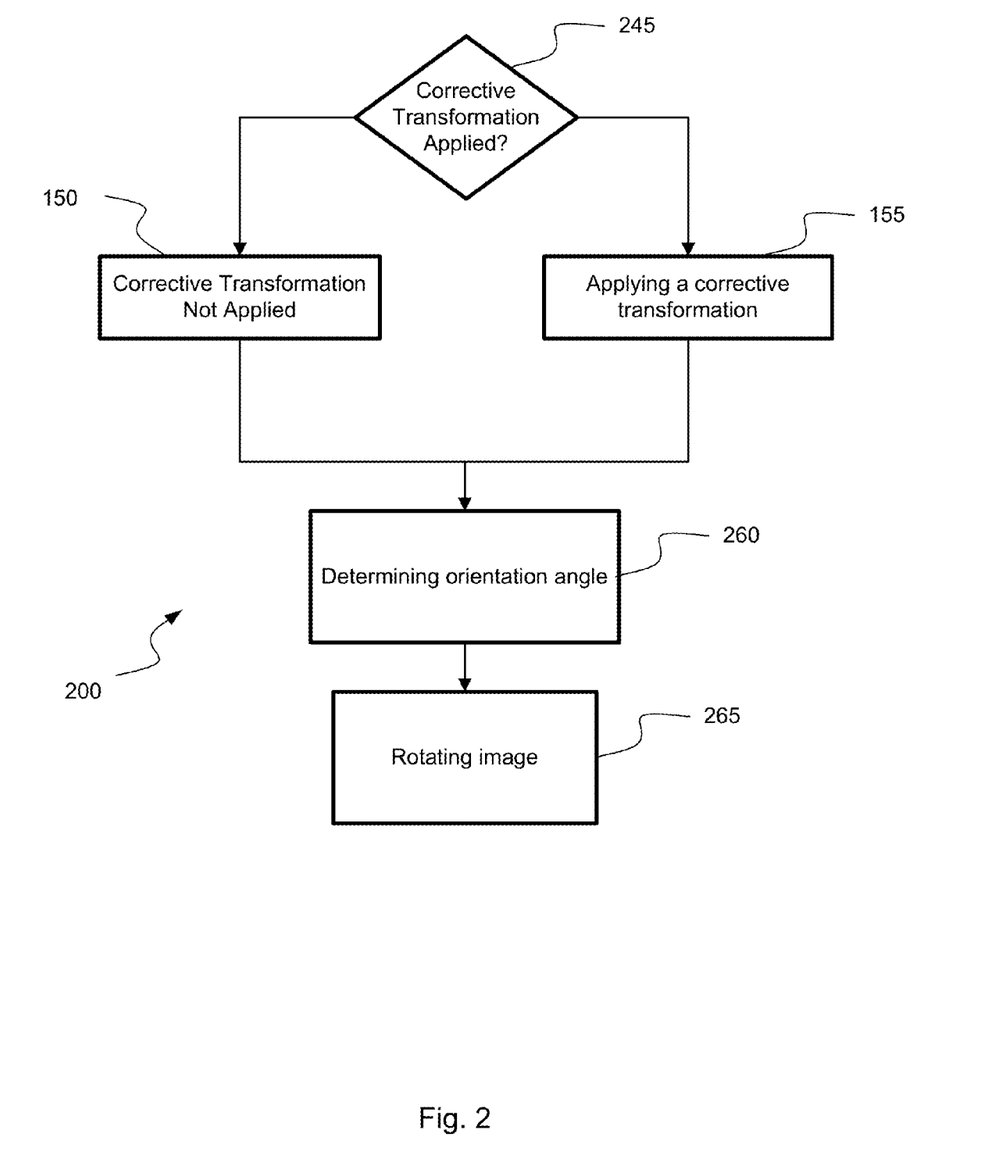
FIG. 2 shows a flow diagram of a process for re-orienting an image.

FIG. 2 shows a flow diagram of a process 200 for re-orienting an image. In some embodiments, an image that has been identified can have a corrective transformation applied 155 as descried above in order to reduce or remove a variance. In alternative embodiments, an image that has been identified may not have a corrective transformation applied 150 for reasons as detailed previously. Whether a corrective transformation has been applied or not, an orientation angle of the image can be determined 260.

This determination can be in reference to an axis of symmetry of a line or set of lines, or can be based on any reference axis within the image or enacted upon the image. The orientation angle of the image as compared to the reference axis can be used in a determination of whether the image should be rotated. In some embodiments, if the orientation angle is any number such that the image is not aligned to the reference axis, a rotation can occur 265.

In other embodiments, a rotation may not be applied unless the orientation angle is over a threshold angle such that rotation is necessary. The threshold angle may be about one degree of difference between the orientation of the image and the reference axis. In other embodiments, the angle may be greater than or less than about one degree, and can be as high as many degrees of difference. In some embodiments, the corrective transformation can include a re-orientation of the image, obviating the need for an additional rotation.

Figure 3:
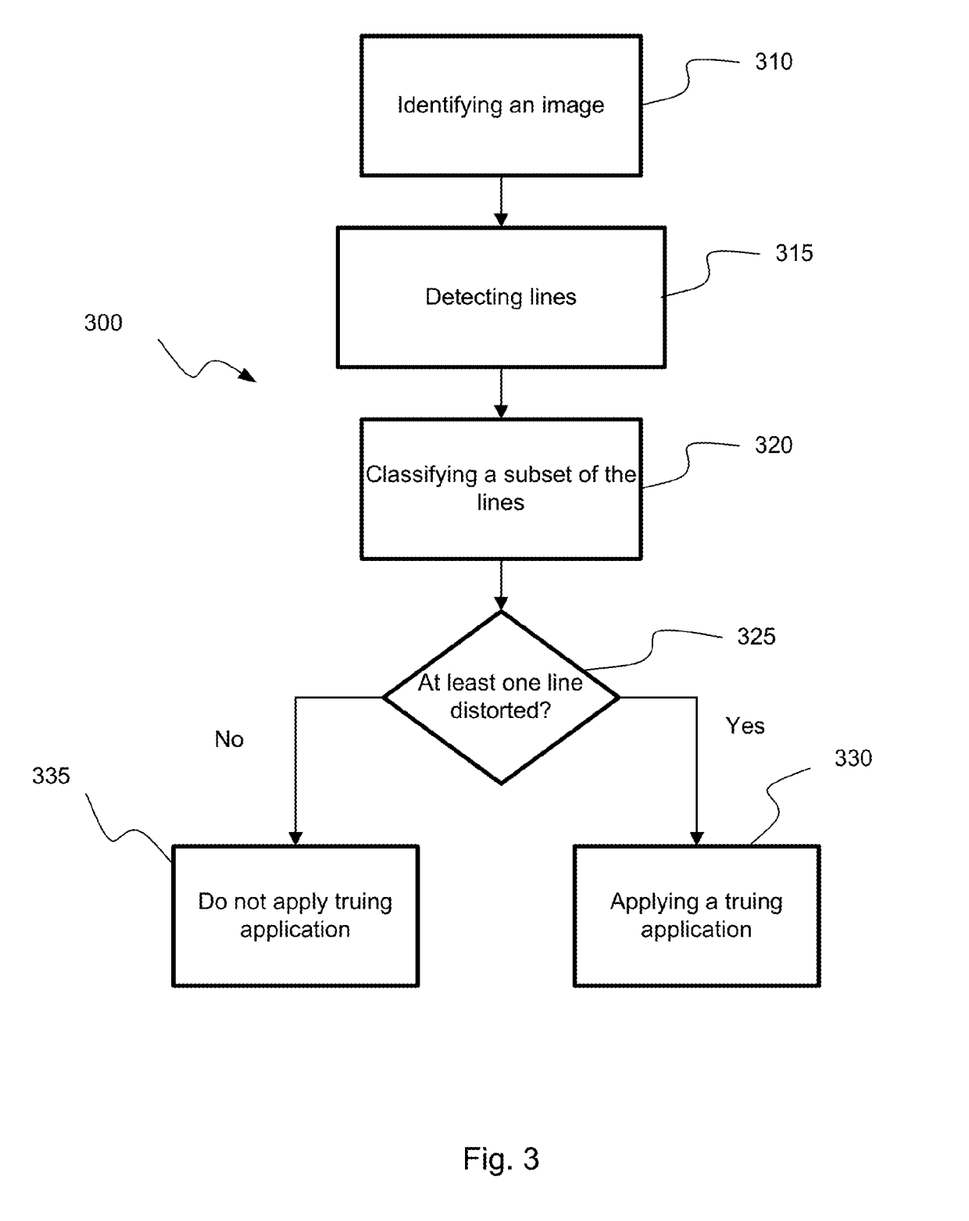
FIG. 3 shows a flow diagram of a process for applying a truing application to an image with at least one distorted line.

FIG. 3 shows a flow diagram of a process 300 for applying a truing application to an image with at least one distorted line. The process 300 can include identifying an image 310 that can be based on a document, picture, or combination of the two. The process can further include detecting lines within the image 315, and classifying a subset of the lines, 320. The detected lines can be classified as either horizontal, vertical, or a combination of horizontal and vertical in some embodiments.

Once the lines have been classified, process 300 can include determining whether at least one line is distorted 325. The distortion determination can be based on a comparative relationship between a first line and another line in some embodiments. The comparative relationship can be based on a line in the same orientation as the first line, or located orthogonal to the line. The comparative relationship can also be based on a comparison of a first line to a set of other lines. In other embodiments, the distortion of a line or set of lines can be based on reference to an axis of symmetry or some other reference axis located within the image or enacted upon the image.

Process 300 can also include applying a truing application 330 to the one or more distorted lines. The truing application can be applied in some embodiments based on a determination of distortion based on a range of acceptable deviations or distortions.

If a distortion is determined to be outside of a specified range or tolerance, the truing application can be applied. The truing application can be capable of adjusting the lines determined to be distorted or the image entirely to be reformed along the projected or a corrected axis of symmetry of the lines to deskew the image.

In some embodiments the truing can include affine transformations, or any type of translation in which collinearity is preserved or recreated. The truing application can also include rotational correction, or any other type of correction to geometric, optical, or perspective distortions that are determined to be unacceptable within the bounds of the current application. In some embodiments, the bounds of acceptable distortion may be higher based on the type of document or image identified, and the truing application may not be applied 335. In other embodiments, the bounds of acceptable distortion may be very low, and the truing application may be applied to any distortion of the image from the original document from which the image is generated.

Figure 4:
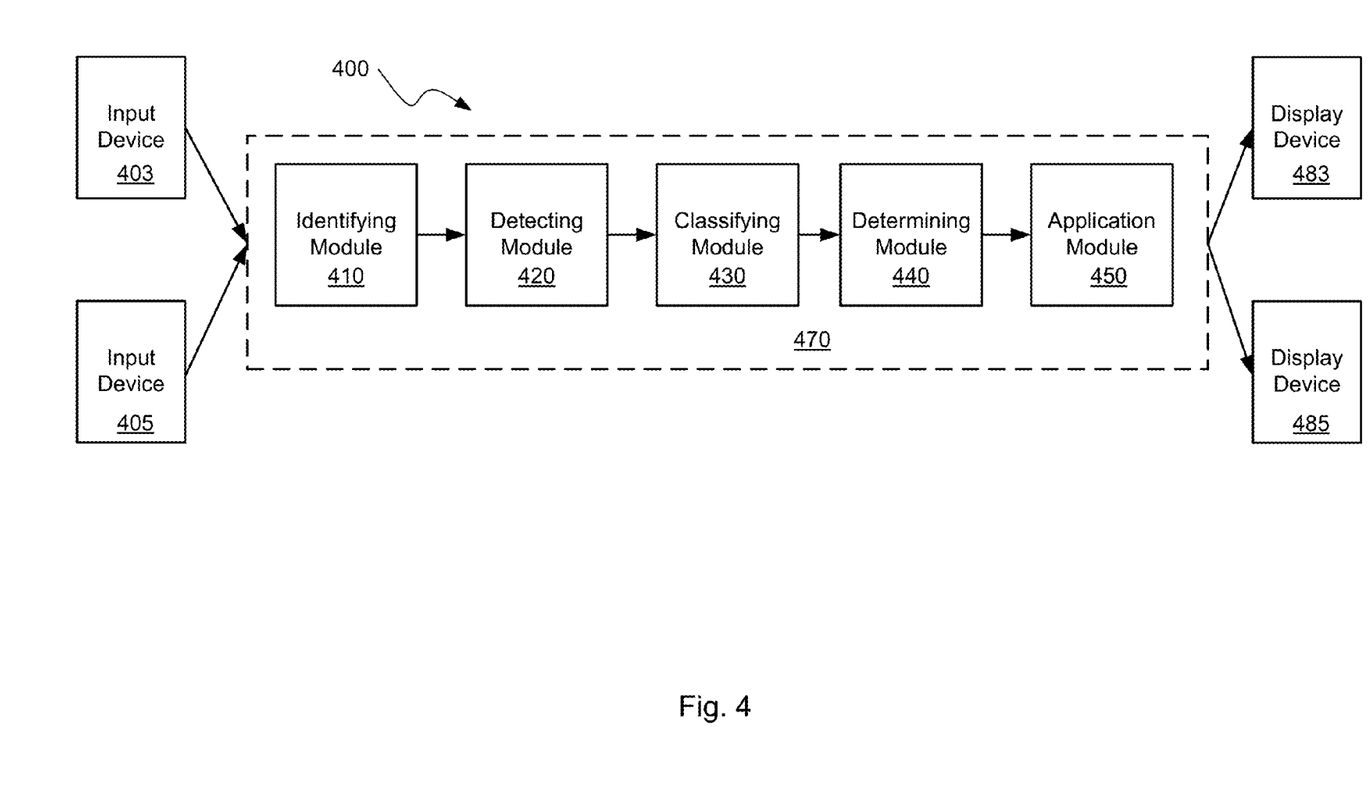
FIG. 4 shows a simplified block diagram of a system that may be used in accordance with an embodiment of the present invention.

FIG. 4 shows a simplified block diagram of a system 400 that may be used in accordance with an embodiment of the present invention. The system 400 may include a device 470 for performing a method in accordance with FIGS. 1-3, or other embodiments of the present invention. The device 470 can be a computer, or can be hardware or software used for implementing the method of correcting alignment. In some embodiments, input devices 403, 405 can generate an image for the device 470. The input devices 403, 405 can be of any type of device that is capable of capturing an image, and can include input devices 520. Any known document imaging system can be used as the input devices 403, 405 to generate the computer-readable image, and can include, for example, microfilm, microfiche, an on-demand printer, a facsimile machine, a copier, a document scanner, a multifunction printer, etc. Alternatively, input devices 403, 405 can be image scanning or transfer devices operable to take a document or an image of a document from another source, and generate a computer-readable image readable by device 470.

Device 470 can include modules for applying a corrective transformation. In one embodiment a module may be strictly implemented in hardware. Alternatively, hardware and software, or only software may be used to implement a module. Device 470 can include an identifying module 410 that can accept the image from the input devices 403, 405. The identifying module 410 can be capable of identifying various images, documents, and files to which the method can be applied. When identifying module 410 identifies an image suitable for the method, detecting module 420 can be used to detect a plurality of lines within the image.

Identifying module 410 can identify an image suitable for the method based on a user input that instructs the system 400 to apply a method of alignment to the image. Alternatively, instructions can be included in the identifying module 410 that can in some embodiments include the types of images or documents to which the method should be applied. These instructions can be based on document types, names, information, or features contained within the document or image.

Detecting module 420 can detect lines within the image based on tables, grids, or other line-based features of a document or image. Once a line or a set of lines has been identified within the image, classifying module 430 can classify at least a subset of the detected lines as horizontal, vertical, or a combination of horizontal and vertical.

In some embodiments, after the classification of lines, a determining module 440 can determine if a variance or distortion exists within or between the line or lines. The variance or distortion can exist between a line or lines and another line or set of lines within the document, such that the determining module 440 can perform a comparative analysis based on the lines and their respective orientations. Alternatively, determiner 440 can compare the classified line or lines to a reference set of axes or an axis of symmetry of the lines to determine the existence or extent of variance or distortion.

Once a determination of variance or distortion has been made, application module 450 can apply a corrective transformation to reduce or remove the variance or distortion. Application module 450 can apply a corrective transformation to every image in which a distortion or variance occurs, or in some embodiments, application module 450 can include instructions for applying a corrective transformation for only certain variances or distortions, or if the determined variances or distortions are over a certain tolerance. The tolerance can be based on a percent or degree from ideal, and can be as small or as large as is required within a situation in which the system 400 is used.

Variables affecting whether a transformation is applied can include the time needed to transform an image, the number of images needing transformation, or the deadline by which a set of transformations must be applied. Also, the decision for whether to apply a corrective transformation can be based on an acceptable tolerance for deviation within an image based on the complexity of the image or the use of an image. If an image is more complex, or is used for an application requiring a high level of detail or resolution, the system 400 may be programmed to be more likely to apply a corrective transformation, or less likely to apply a transformation depending on the specific circumstances.

After the application module 450 has applied a corrective transformation, system 400 can display or transfer the image to a display device 483, 485. The display device 483, 485 can include a monitor, visualizer, or another application that is capable of displaying the image for use in another application or for display in a final form. In some embodiments, another output device can be used as display device 483, 485, and can include output devices 530.

Figure 5:
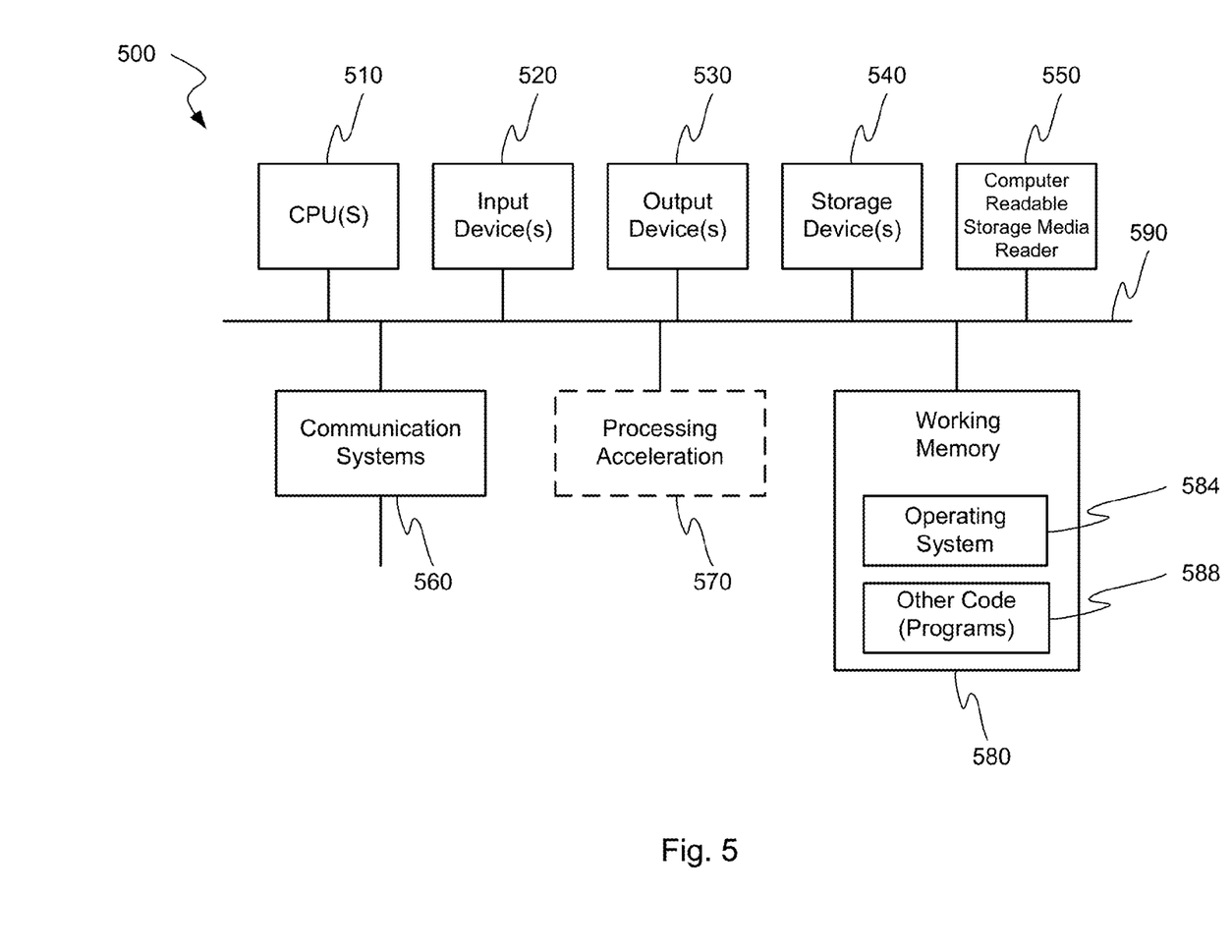
FIG. 5 shows a simplified block diagram of a computer system capable of being used in at least some portion of the processes of the present invention, or for implementing at least some portion of the methods of the present invention.

FIG. 5 is a block diagram illustrating an exemplary computer system 500 in which embodiments of the present invention may be implemented. This example illustrates a computer system 500 such as may be used, in whole, in part, or with various modifications, to provide the functions of the Identifier, the Detector, the Classifier, the Determiner, the Applicator, and/or other components of the invention such as those discussed above. For example, various functions of the method for correcting alignment may be controlled by the computer system 500, including, merely by way of example, detecting a plurality of lines in an image, determining that a variance or distortion exists, applying a corrective transformation, etc.

The computer system 500 is shown comprising hardware elements that may be electrically coupled via a bus 590. The hardware elements may include one or more central processing units 510, one or more input devices 520 (e.g., a mouse, a keyboard, etc.), and one or more output devices 530 (e.g., a display device, a printer, etc.). The computer system 500 may also include one or more storage device 540. By way of example, storage device(s) 540 may be disk drives, optical storage devices, solid-state storage devices such as a random access memory ("RAM") and/or a read-only memory ("ROM"), which can be programmable, flash-updateable and/or the like.

The computer system 500 may additionally include a computer-readable storage media reader 550, a communications system 560 (e.g., a modem, a network card (wireless or wired), an infra-red communication device, Bluetooth™ device, cellular communication device, etc.), and working memory 580, which may include RAM and ROM devices as described above. In some embodiments, the computer system 500 may also include a processing acceleration unit 570, which can include a digital signal processor, a special-purpose processor and/or the like.

The computer-readable storage media reader 550 can further be connected to a computer-readable storage medium, together (and, optionally, in combination with storage device(s) 540) comprehensively representing remote, local, fixed, and/or removable storage devices plus storage media for temporarily and/or more permanently containing computer-readable information. The communications system 560 may permit data to be exchanged with a network, system, computer and/or other components described above.

The computer system 500 may also comprise software elements, shown as being currently located within a working memory 580, including an operating system 584 and/or other code 588. It should be appreciated that alternate embodiments of a computer system 500 may have numerous variations from that described above. For example, customized hardware might also be used and/or particular elements might be implemented in hardware, software (including portable software, such as applets), or both. Furthermore, connection to other computing devices such as network input/output and data acquisition devices may also occur.

Software of computer system 500 may include code 588 for implementing any or all of the function of the various elements of the architecture as described herein. For example, software, stored on and/or executed by a computer system such as system 500, can provide the functions of the Identifier, the Detector, the Classifier, the Determiner, the Applicator, and/or other components of the invention such as those discussed above. Methods implementable by software on some of these components have been discussed above in more detail.

III. EXAMPLES

Example 1

Correcting Alignment of an Image

This example provides a method according to the present invention for correcting the alignment of an image.

Figure 6:
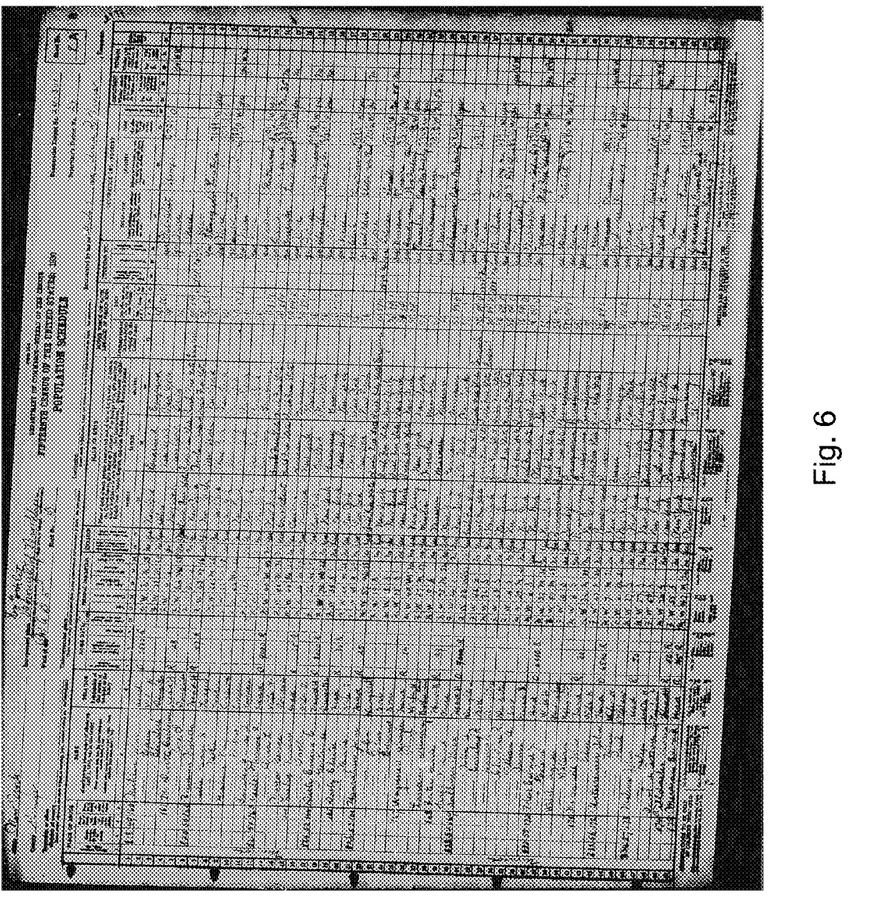
FIG. 6 shows an example of an imaged document that includes a variance in accordance with an embodiment of the present invention.

FIG. 6 shows an example of a generated computer-readable image of a census document in which shear distortion in addition to a rotational distortion exists. The image was generated by scanning archived microfiche, and thus the distortion existed prior to performing the generation of the computer-readable image.

Figure 7:
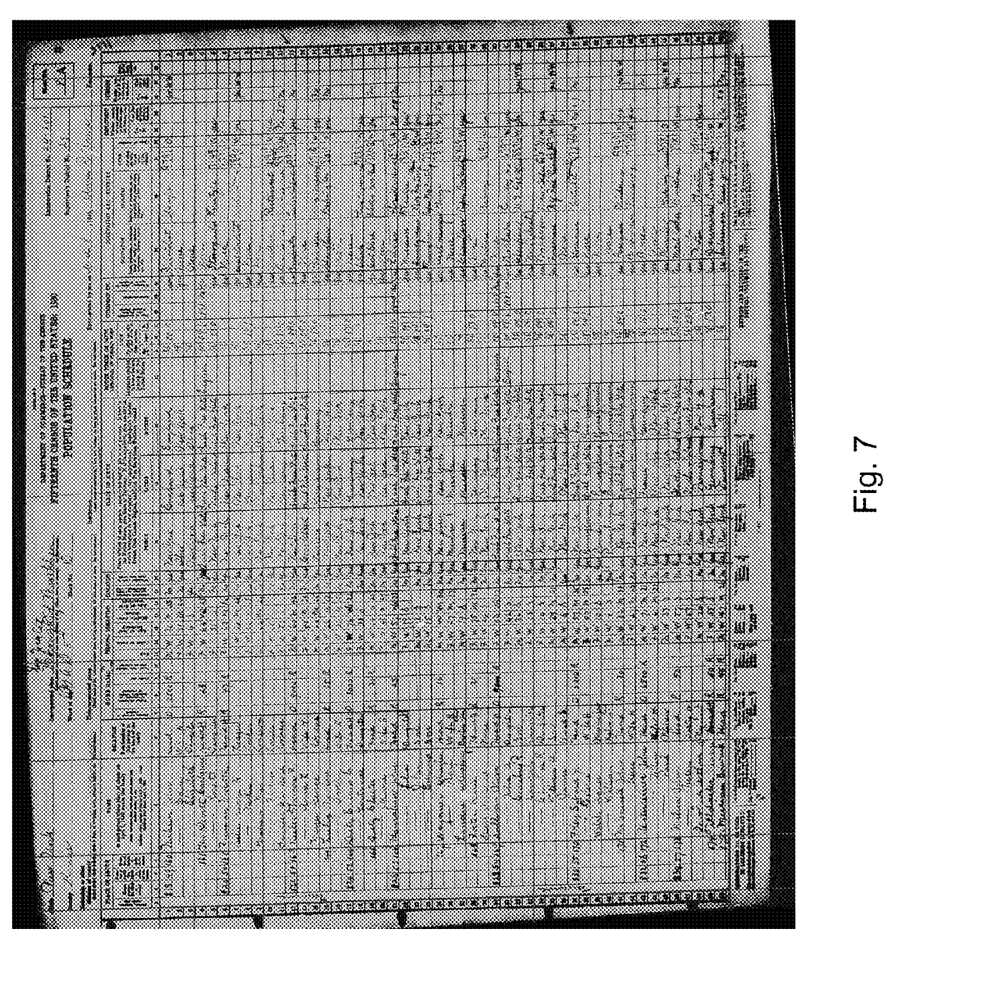
FIG. 7 shows an example of an application detecting horizontal and vertical lines in accordance with an embodiment of the present invention.

FIG. 7 shows an example of an application according to an embodiment of the present invention detecting lines within the generated image. The detection involved analyzing the image of the document and classifying at least a subset of the lines within the image as horizontal lines or vertical lines. After the lines had been classified as horizontal or vertical, and algorithm modeled the image and the classified lines to determine the best ways of transforming the image.

It is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be rearranged. A process may be terminated when its operations are completed, but could have additional steps not discussed or included in a figure. Furthermore, not all operations in any particularly described process may occur in all embodiments. A process may correspond to a method, a function, a procedure, a subroutine, a subprogram, etc. When a process corresponds to a function, its termination corresponds to a return of the function to the calling function or the main function.

In one set of embodiments, the techniques described herein may be implemented as program code executable by a computer system (such as a computer system 1400) and may be stored on machine-readable storage media. Machine-readable storage media may can include any appropriate media known or used in the art, including storage media and communication media, such as (but not limited to) volatile and non-volatile, removable and non-removable media implemented in any method or technology for storage and/or transmission of information such as machine-readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store or transmit the desired information and which can be accessed by a computer.

Further, while embodiments of the present invention have been described using a particular combination of hardware and software, it should be recognized that other combinations of hardware and software are also within the scope of the present invention. Embodiments of the present invention may be implemented only in hardware, or only in software, or using combinations thereof. The specification and drawings are, accordingly, to be regarded in an illustrative rather than a restrictive sense. The scope of the invention should be determined not with reference to the above description, but instead should be determined with reference to the pending claims along with their full scope or equivalents.

As used herein and in the appended claims, the singular forms "a", "an", and "the" include plural references unless the context clearly dictates otherwise. Thus, for example, reference to "a process" includes a plurality of such processes, and reference to "the application" includes reference to one or more applications and equivalents thereof known to those skilled in the art, and so forth.

Also, the words "comprise", "comprising", "include", "including", and "includes", when used in this specification and in the following claims, are intended to specify the presence of stated features, integers, components, or steps, but they do not preclude the presence or addition of one or more other features, integers, components, steps, acts, or groups.

What is claimed is:

1. A method of correcting alignment of an image, the method comprising:
   identifying an image of a document;
   detecting a plurality of lines that appear within the image;
   classifying at least a subset of the plurality of lines as horizontal lines or vertical lines;
   determining that a variance exists within the subset of the plurality of lines, wherein the variance that exists within the subset of the plurality of the lines is between at least one horizontal line and at least one vertical line, and the variance comprises the intersection of the lines being at an angle other than perpendicular to each other; and
   applying a corrective transformation to adjust the image, wherein the variance within the subset of the plurality of lines is at least partially reduced as compared to the variance prior to the application of the corrective transformation.

2. The method of correcting alignment of an image as in claim 1, wherein the variance comprises skew or shear distortion.

3. The method of correcting alignment of an image as in claim 1, further comprising after applying the corrective transformation:
   determining that the adjusted image orientation is at an angle other than the orientation of a reference set of axes; and
   rotating the adjusted image to equalize the orientation of the adjusted image with the reference set of axes.

4. The method of correcting alignment of an image as in claim 1, wherein the identification of the image occurs at a computer imaging device that processes the image identified, stores the image, and retrieves the image prior to detecting the plurality of lines within the image.

5. The method of correcting alignment of an image as in claim 1, wherein the image is a computer readable image.

6. The method of correcting alignment of an image as in claim 5, further comprising generating the computer readable image with a document imaging system that captures the image of a document.

7. The method of correcting alignment of an image as in claim 6, wherein the document imaging system comprises at least one of microfilm, microfiche, an on demand printer, a facsimile machine, a copier, a document scanner, or a multifunction printer.

8. The method of claim 1, wherein the document comprises at least one of a table, a grid, or another detectable line-based aspect of the image.

9. A non-transitory computer-readable medium having sets of instructions stored thereon, which when executed by a computer cause the computer to:
   identify an image of a document;
   detect a plurality of lines that appear within the image;
   classify at least a subset of the plurality of lines as horizontal lines or vertical lines;
   determine that a variance exists within the subset of the plurality of lines, wherein the variance that exists within the subset of the plurality of the lines is between at least one horizontal line and at least one vertical line, and the variance comprises the intersection of the lines being at an angle other than perpendicular to each other; and
   apply a corrective transformation to adjust the image, wherein the variance within the subset of the plurality of lines is at least partially reduced as compared to the variance prior to the application of the corrective transformation.

* * * * *